United States Patent [19]
Crisa

[11] 3,750,430
[45] Aug. 7, 1973

[54] AUTOMOTIVE LOCKING SYSTEM
[76] Inventor: Anthony Crisa, 7801 34th Ave., Jackson Heights, Queens, New York, N.Y. 11372
[22] Filed: July 10, 1972
[21] Appl. No.: 270,149

[52] U.S. Cl............. 70/1.5, 70/243, 70/441, 70/455, 137/354, 137/384.2, 200/44, 200/61.86
[51] Int. Cl............................. B60r 25/04
[58] Field of Search............. 70/1.5, 239, 242, 70/243, 251, 255, 257, 432, 441, 455, DIG. 49, DIG. 81; 137/354, 384.2; 200/44, 61.86

[56] References Cited
UNITED STATES PATENTS
| | | | |
|---|---|---|---|
| 1,345,672 | 7/1920 | Henckler | 70/243 |
| 1,217,406 | 2/1917 | Burkhardt | 137/384.2 |
| 1,025,105 | 4/1912 | Youngs | 70/242 |
| 2,399,033 | 4/1946 | Hudson | 200/61.86 |
| 1,531,970 | 3/1925 | Nilson | 70/243 |
| 2,439,978 | 4/1948 | Komchan | 70/455 |
| 2,623,133 | 12/1952 | Evans | 200/44 |
| 1,764,898 | 6/1930 | Segal | 70/1.5 |

FOREIGN PATENTS OR APPLICATIONS
92,402   5/1938   Sweden.................. 70/243

Primary Examiner—Albert G. Craig, Jr.
Attorney—Jeffrey A. Schwab

[57] ABSTRACT

An ancillary ignition cutout switch and a fuel line valve are carried in a housing secured beneath an automobile floorboard. The housing includes a cage rendering the switch and valve inaccessible to unauthorized manipulation. A cylinder lock, the key slot of which is accessible from the floorboard is key operable to rotate the valve stem and open or close the fuel line. A cam rides on the valve stem to actuate the switch which completes the ignition circuit only when the valve is in the open position.

10 Claims, 8 Drawing Figures

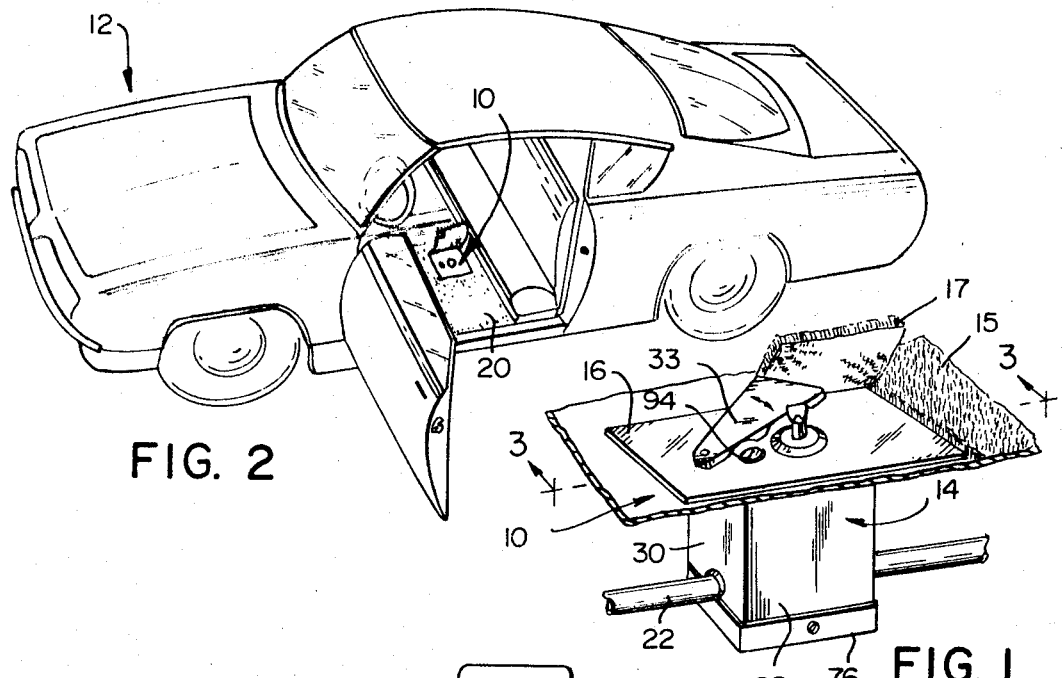
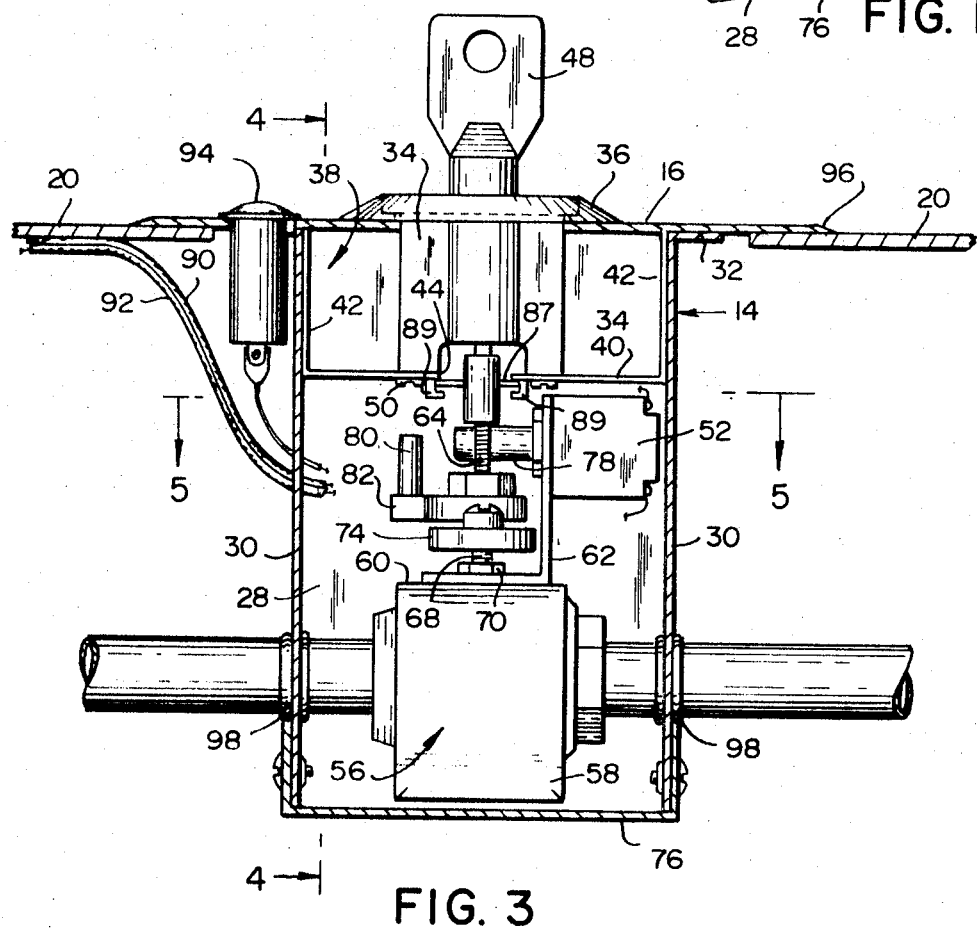

AUTOMOTIVE LOCKING SYSTEM

BACKGROUND OF THE INVENTION

1. Field of the Invention

This invention relates generally to automotive security systems for preventing the unauthorized operation of a vehicle, and more particularly to locking devices for the selective concomitant actuation of the vehicle ignition circuit and a fuel line valve.

2. Brief Description of the Prior Art

The alarming increase in the incidence of automobile thefts has been of great concern, not only to the vehicle owner, victims, but to law enforcement agencies, insurance carriers, and automobile manufacturers as well. Aside from the thefts which resulted from the automobile operator's failure to remove the ignition key from an unattended vehicle, and other thefts attributable to youngsters seeking to "joyride," a great proportion of thefts were the result of professional experienced theives who utilized various devices to either remove or otherwise bypass conventional automotive security locks.

The experienced thief removed conventional ignition locks, even those which incorporated a steering wheel locking mechanism. One of the devices employed to remove locks, the "slammer," included a shaft having a hardened pointed tip spiral thread at one end and a stop flange at the other. A slidable cylindrical weight was mounted to the shaft. The thief obtained a biting engagement in the cylinder plug key slot by forcing the pointed end of the slammer into the key slot and rotating the shaft. The cylinder plug was removed by slamming the weight against the stop flange thereby pulling the cylinder plug from the lock or the entire lock from its mounting. Once the plug or lock was removed, a screwdriver was all that was necessary to operate the ignition switch.

Among the anti-theft devices heretofore employed, were auxiliary ignition switches, various burglar alarms and accessory steering wheel locks. In general, most of these accessory devices were subject to the same unauthorized tampering as the vehicle locks which were originally equipped with the vehicle. That is, the lock cylinder plugs and/or entire locks were subject to being pulled or otherwise removed and the security mechanisms then operated by a screwdriver or a similar implement.

A further problem with the security devices used heretofore was that a great number were primarily directed toward an objective of preventing, unauthorized operation from but a single mode. An accessory steering wheel lock was directed toward preventing rotation of the steering wheel. The ignition cutout switch was directed toward preventing operation of the ignition system. A burglar alarm was directed toward providing an audible signal upon unauthorized entry into the vehicle.

The experienced thief quickly effected a rerouting or bypass of such singular vehicle disabling mode. The steering wheel lock was avoided by pulling the cylinder, an ignition system was rendered operable through the use of jumper wires and a burglar alarm was quickly rendered inoperative.

Although key operated fuel line valves were proposed heretofore, e.g., in U.S. Pat. No. 2,881,789, they were, for the most part, susceptible to the same tampering as other anti-theft devices and, once the lock was pulled, could be operated with a screwdriver.

SUMMARY OF THE INVENTION

The instant invention provides both an ancillary ignition cutout switch and a fuel line valve which are actuated through the rotation of a floorboard mounted cylinder lock and are inaccessible from within the vehicle. The switch and fuel line valve are positioned with a protective housing which includes a lock cage wherein the lock body is positioned. The lock cage employs a relatively small accessway through which an actuating mortise tail extends from the lock cylinder to the tenoned stem of the valve. If the cylinder lock or plug is pulled from above the floorboard, a spring loaded gate closes the accessway to prohibit manual rotation of the valve stem and/or actuation of the switch through the use of conventional burglary implements.

From the above, it will be appreciated that it is an object of the present invention to provide an automotive security system which is so constructed that it is not subject to any of the aforementioned disadvantages.

A further object of the present invention is to provide an automotive security system of the general character described wherein a cylinder lock is employed to control the actuation of both a fuel line valve and an ancillary ignition cutout switch.

Another object of the present invention is to provide an automotive security system of the general character described which furnishes vehicles with both anti-theft and fire retardment protection.

An additional object of the present invention is to provide an automotive security system of the general character described which includes a fuel line locking device in addition to an ancillary ignition cutout switch to prevent unauthorized operation of the vehicle even if the conventional automotive ignition circuit has been bypassed.

A still further object of the present invention is to provide an automotive security system of the general character described which includes a fuel line locking device in addition to an ancillary ignition cutout switch to prevent unauthorized operation of the vehicle even if the conventional automotive ignition circuit has been bypassed.

A still further object of the present invention is to provide an automotive security system of the general character described wherein the system may be concealed from view to deter tampering.

A further object of the present invention is to provide an automotive security system of the general character described wherein unauthorized tampering with a vehicle disabling mechanism is prevented, even if the cylinder lock which actuates such mechanism is removed.

Another object of the present invention is to provide an automotive security system of the general character described which is equally adapted for original equipment installation purposes or as an automotive accessory separately sold for installation in vehicles in current usage.

A further object of the present invention is to provide an automotive security system of the general character described wherein any one of a number of conventional cylinder locks may be employed to actuate vehicle disabling mechanisms including both an ancillary ignition cutout switch and a fuel line valve.

Other objects of the invention in part will be obvious and in part will be pointed out hereinafter.

With these ends in view, the invention has embodiment in certain combinations of elements and arrangements of parts by which the said objects and certain other objects are hereinafter attained, all as fully described with reference to the accompanying drawings, and the scope of which is more particularly pointed out and indicated in the appended claims.

BRIEF DESCRIPTION OF THE DRAWINGS

In the accompanying drawings in which is shown one of the various possible exemplary embodiments of the invention, FIG. 1 is a perspective illustration of a typical vehicle, e.g., an automobile, wherein the automotive security system of the present invention is employed, and illustrating on the floorboard of the vehicle, the portions of the system which are accessible from within the driving compartment;

FIG. 2 is an enlarged fragmentary perspective illustration of the security system as shown in FIG. 1 wherein portions of the vehicle floorboard are cut away to illustrate the vehicle fuel line and to show the system in greater detail;

FIG. 3 is an enlarged sectional view through the system, the same taken substantially along the plane 3—3 of FIG. 2 and showing an ancillary ignition switch and a fuel line valve positioned within a housing secured beneath the vehicle floorboard;

DESCRIPTION OF THE PREFERRED EMBODIMENT

Figure 5:
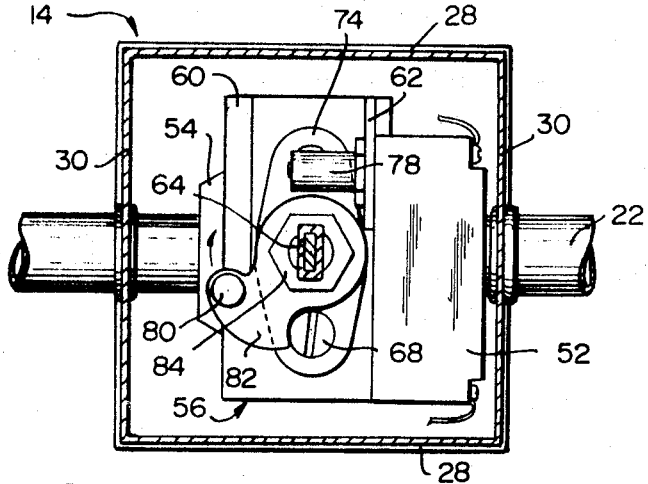
FIG. 5 is a sectional view through the system, the same being taken substantially along the line 5—5 of FIG. 3.
Figure 7:
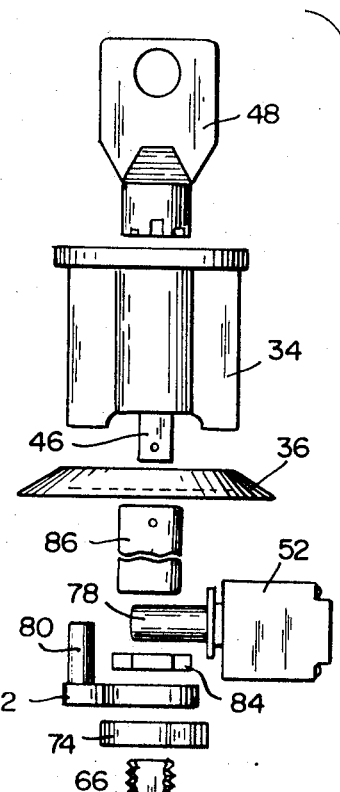
FIG. 7 is an exploded illustration of several components of the system and showing their relative interpositioning.

Referring now in detail to the drawings, the reference numeral 10 denotes generally the security system of the present invention. This system is designed for employment within an automotive vehicle 12 and, in particular, is designed to provide both an ancillary ignition cutout and a fuel line shutoff to preclude unauthorized operation of the vehicle 12. The system 10 includes a protective housing 14 positioned beneath a generally planar guard plate 16 which desirably is of a hardened metal. To install the system 10 in the vehicle 12, a suitable aperture 18 (see FIG. 3) is provided through the floorboard 20 of the vehicle 12. The term "floorboard" generally refers to the flooring of the vehicle which is most commonly sheet steel. The installation may be accomplished by first cutting through any floor covering 15 e.g. carpet etc. in the vehicle. The floor covering is preferably cut so that a flap 17 of floor covering 15 may be provided to conceal the security system from view, thus rendering it unobtrusive and thereby increasing its theft deterrent capabilities.

It is most desirable to cut the floorboard aperture 18 in a region or zone such that the security system will conveniently intercept an automotive fuel line 22 which extends beneath the floorboard from a fuel storage tank 24 to a fuel pump 26 (see FIG. 8) for introduction to a carburetor (not shown).

The protective housing 14 includes substantially rectangular side and end plates 28, 30 respectively with the end plates 30 appropriately notched adjacent their lower edges to accommodate the fuel line 22. The housing is secured to the guard plate 16 adjacent the upper edges of the plates 28, 30. Exemplary of a suitable mode for securing the housing to the guard plate 16 would be the formation of a one piece flange 32 at the upper edge of each plate and spot welding the flange to the guard plate 16.

The guard plate 16 includes a central aperture of a size to accommodatingly receive a cylinder lock such as a conventional rim cylinder lock 34. Although any cylinder lock may be utilized, it has been found that a pick resistant lock cylinder is most desirable such as the cylinder lock described in U.S. Pat. No. 1,984,202. This particular lock has also been found resistant to conventional modes of pulling. The utilization of a hardened bezel 36 surrounding the face of the lock is advantageous as a deterrent to tampering.

A cover plate 33 may be optionally provided to protect the face of the cylinder lock when the vehicle is not in operation. The cover plate 33 may be pivotally secured to the guard plate 16 to close over the cylinder lock face. With the plate 33 covering the face, particulate matter such as dirt and/or small debris bits which may collect on the floor covering will not enter the key slot.

As has been mentioned heretofore, a cage 38 is provided within the housing to accommodate the lock. The cage 38 is generally U-shaped and includes a floor 40 and two upright side walls 42. As will be subsequently described, the floor includes a gated actuation accessway 44 and suitable apertures for securement to the base of the cylinder lock 34. The cage 38 may be secured in the housing 14 prior to joining the housing to the guard plate 16. To join the cage to the housing, the side walls 42 are fastened to the end plates 30 through any conventional fastening mode, e.g., welding, rivets, etc. After the cage 38 is secured in position, the housing is affixed to the guard plate 16. The floor 40 includes suitable apertures for a pair of machine screws 50 which are utilized to secure the cylinder lock within the cage 38 and prevent the unauthorized removal of the entire lock from the cage.

Figure 4:
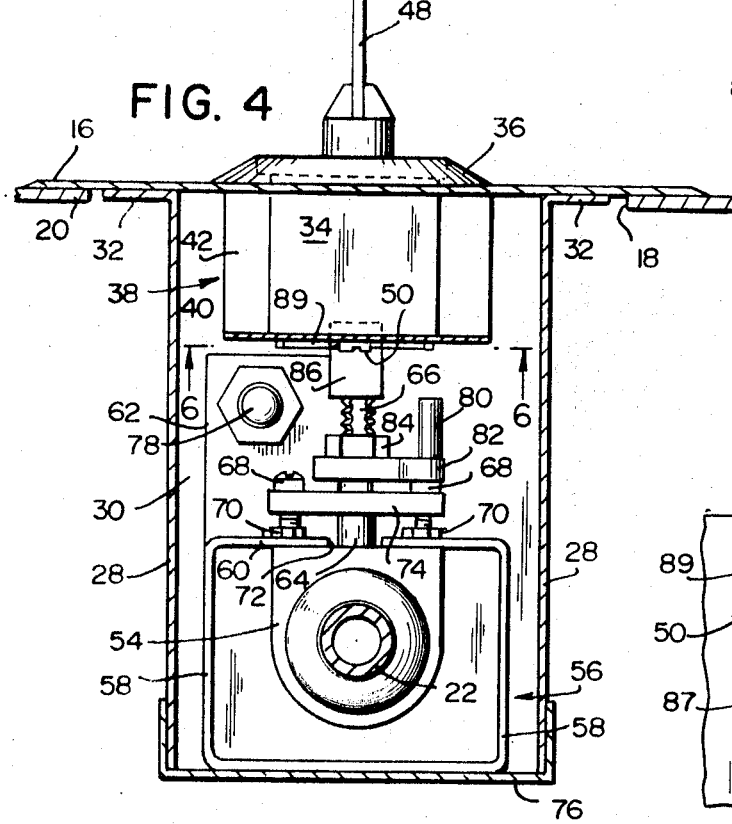
FIG. 4 is a further sectional view through the system the same being taken substantially along the lines 4—4 of FIG. 3.

In accordance with the invention, rotation of the cylinder plug of the lock 34 through the use of a suitable key 48 cojointly actuates both an ignition auxiliary cutout switch 52 and a fuel line valve 54, both of which are positioned within the housing 14. The valve 54 is held within a valve mount 56 having a pair of substantially vertical legs 58, and an apertured top 60 from which a substantially L-shaped switch bracket 62 projects. The top 60 includes central slot 72 to accommodatingly receive a valve stem 64 which is threaded for substantially its entire length. The stem 64 includes a pair of opposed substantially parallel flats 66 adjacent its upper end to facilitate rotating actuation by providing a non-circular tenon. The valve 54 is secured in the mount 56 through the use of a pair of stove bolts 68 extending into threaded sockets of the valve 54. Each bolt includes a suitable nut 70 to bear against the top 60. It will be appreciated however, that the head of each of the stove bolts 68 retains and secures a gland 74 (see FIGS. 3, 4 and 5). The gland 74 bears against the valve stem 64, yet permits rotation of the stem to actuate the valve. It should also be noted that the mount 56 is affixed to a bottom lid 76 which slips over the otherwise open bottom of the housing 14.

As has been mentioned heretofore, a switch bracket 62 projects from the top 60 of the valve mount 56. The bracket 62 includes a suitable aperture to facilitate the mounting of the switch 52 such that a switch plunger 78 may be engaged by a cam post 80 extending from a cam 82 which rides on the valve stem 64. The cam 82 includes a non-circular aperture to mate with the flats 66 of the valve stem. The cam 82 is retained on the valve stem 64 through the use of a conventional nut 84 threaded to the stem. From an observation of FIG. 5 it will be appreciated that the cam 82 is contoured to provide rotation stops for both the open and closed positions of the system by accommodatingly abutting against the heads of the stove bolts 68.

Figure 6:
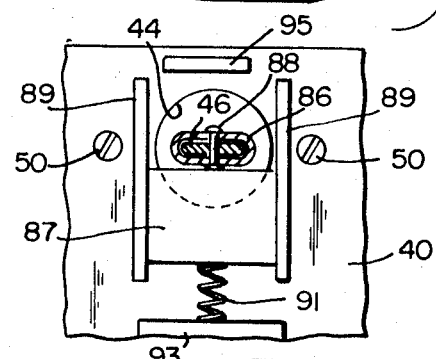
FIG. 6 is a fragmentary sectional view through a protective housing of the system, same being taken substantially along the line 6—6 of FIG. 4, with portions deleted for clarity, and showing the undersurface of a lock cage within which the lock cylinder is carried and which provides an accessway and includes a spring biased gate which closes the accessway upon removal of the lock.

A tail 46 of the lock 34 rotates with the cylinder plug. To couple the tail to the valve stem 64 for coaxial rotation, a mortise sleeve 86 is provided. The sleeve 86 is adapted to slide over the tenon end portion of the valve stem 64 which is formed by the flats 66. Preferably the mortise sleeve 86 is secured at its upper end to the tail 46 or may be provided in one piece therewith. An exemplary manner of securing the tail and mortise sleeve is through the utilization of a rivet 88 (see FIG. 6) which extends through registered apertures in the mortise sleeve 46 and the tail 86. Numerous optional modes of securement are available, e.g., cement, welding, brazing, crimping, etc. The hollow interior of the sleeve at its lower end accommodatingly receives and couples the tail 46 to the tenon end of the valve stem 64.

The sleeve 86 extends through the circular accessway 44 in the floor 40 of the cage 38. The accessway is just sufficient to permit rotation of the sleeve. The floor 40 would thus provide a barrier to unauthorized rotation of the valve stem should the cylinder lock or plug be pulled. If, for instance, a thief pulled the cylinder lock, he could not get an implement capable of grasping and rotating the stem, e.g., a pair of pliers, etc. through the accessway.

A further safeguard against unauthorized actuation of the vehicle disabling mechanisms within the housing is provided in the form of a gate 87 (see FIG. 6) slidably secured to the underside of the floor 40. The gate 87 is mounted for limited reciprocal movement between a pair of parallel channel rails 89 extending on opposite sides of the accessway 44. A spring 91 is biased between a boss 93 and the gate 87 to urge the gate against the mortise sleeve 86. Should the cylinder lock and/or plug be pulled, the sleeve 86 will be lifted from the valve stem 64 and withdrawn through the accessway 44 since the sleeve is secured to the cylinder tail 46. As soon as the sleeve 86 is withdrawn, the gate 87 will slide closed to cover the accessway 44. A stop 95 is provided to limit the movement of the gate.

With the gate 87 closed the valve stem and/or switch plunger 78 cannot be actuated from inside the vehicle since the accessway is completely blocked. Thus, even if an implement similar to the mortise sleeve were possessed by the thief, it could not be inserted past the gate 87 which snapped closed when the cylinder was pulled.

Figure 8:
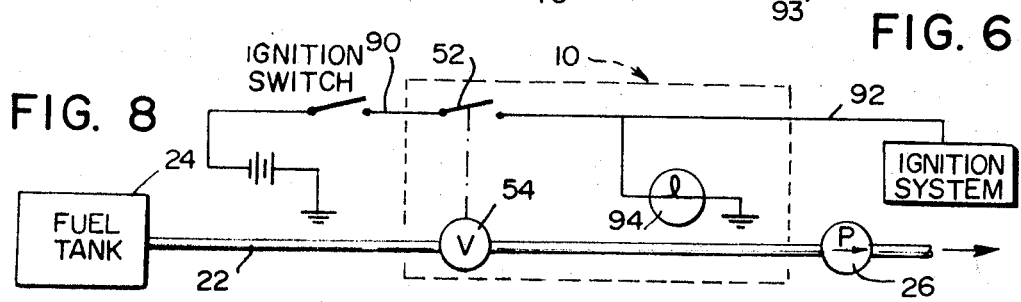
FIG. 8 is a schematized illustration of the security system within the vehicle.

The locking system 10 of the present invention is utilized to intercept the ignition circuit as illustrated in FIG. 8. It will be appreciated that the switch 52 is in a normally open position to be closed only upon engagement of the cam post 80 against the plunger 78. Referring now in greater detail to FIG. 8, it will be seen that in a typical application a lead 90 extends from the ignition switch to the auxiliary cutout switch 52. From the switch 52 a lead 92 extends to the ignition system of the vehicle to that portion of the circuit which would ordinarily be energized directly from the ignition switch, e.g., an ignition coil. The locking system may also employ an optional indicator lamp 94 which would be energized when the locking system is in the vehicle operating mode.

As initially mentioned, the locking system 10 is mounted through the floorboard 20 of the vehicle and within a suitable aperture 18. The aperture 18 is dimensioned to be larger than the transverse cross sectional dimensions of the housing 14, yet smaller than the dimensions of the guard plate 16. It is most desirable to construct the guard plate 16 of a hardened sheet metal and with the system securely mounted to the floorboard by any conventional means, e.g., a lap weld 96 around the periphery of the guard plate 16, bolts, rivets, etc. It will be appreciated that since the system is joined to the fuel line 22, even if the securement means between the guard plate 16 and the floorboard could be broken, the fuel line 22 itself would prevent the entire system from being lifted up through the floorboard. Thus, the vehicle would have to be jacked up and the fuel line disconnected and bypassed around the housing from beneath the vehicle floorboard in order to operate the vehicle.

In installing the system 10 in the vehicle 12, the bottom lid 76 to which the valve mount 56 and valve 54 are secured, is joined to the housing after the housing and guard plate 16 have been secured through the aperture. It is of course necessary to move the gate 87 to its open position from the undersurface of the cage floor 40 to permit the mortise sleeve to pass through the accessway 44 whether the lock 34 is inserted before or after the guard plate 16 is secured to the floorboard. The fuel line is coupled through the valve with the use of suitable conventional fluid line fittings (not shown), similar to those illustrated in U.S. Pat. No. 2,881,789. Such fittings may be at convenient positions along the fuel line 22, it being appreciated that in the drawings, the fuel line 22 is illustrated as extending directly to the valve 54. However, the portion of the fuel line 22 as shown may be originally permanently secured to the valve with the opposed ends patched into the existing fuel line.

It will also be appreciated that the entire system 10 is preferably made moisture impermeable through the utilization of suitable seals such as the grommets 98 which extend around the fuel line.

The value of the locking system in retarding vehicular fires should not be underestimated. By closing the fuel line valve, the supply of flammable fluid to an engine compartment fire can be choked off. This is an especially meritorious safeguard in an unattended vehicle. Furthermore, its utility in preventing the fuel supply from reaching a fire when the vehicle is occupied is of equal, if not paramount importance.

The vehicle locking system will prevent unauthorized vehicle operation, even when conventional ignition locks are bypassed. Should jumper wires be used, the vehicle may start, however, the short supply of fuel between the fuel line valve and the carburetor will quickly become consumed leaving the vehicle totally disabled, usually in a conspicuous position, e.g., on a roadway, which position will deter the unauthorized operator from attempting to determine and correct the cause of the new disablement.

It is further evident that the vehicle locking system of the present invention could be readily adapted for use in conjunction with a sobriety testing device to enable the authorized operator actuating access to the auxiliary ignition switch and fuel line valve only after successfully completing a neuro-physiological driving capability test.

Thus it will be seen that there is provided a security system which achieves the various objects of the invention and is will suited to meet the conditions of practical use.

As various changes might be made in the system as above set forth, it is to be understood that all matter herein described or shown in the accompanying drawings is to be interpreted as illustrative and not in a limiting sense.

What is claimed is:

1. An automotive security system for use in a vehicle to prevent unauthorized operation of the vehicle, said system comprising a cylinder lock having a rotatable element and adapted to be affixed with the face thereof within the driving compartment of the vehicle for actuation from within said compartment, a housing adapted for positioning remote from said compartment and behind the face of said cylinder lock, the cylinder lock extending into the housing, a mortise sleeve, means interconnecting the mortise sleeve and the rotatable element (cylinder lock) for unitary rotation of the mortise sleeve and the rotatable element (cylinder lock element), a vehicle fuel line valve, said valve being positioned within the housing, an auxiliary ignition switch, said switch being positioned within the housing, the valve having a valve stem extending toward the lock, the valve stem including means forming a non-circular tenon end, the mortise being drivingly coupled to the tenon end for unitary substantially coaxial rotation of the stem with the element from a first position wherein the valve is open to a second position wherein the valve blocks fuel flow therethrough, and means within the housing actuating the switch to complete the vehicle ignition circuit when the stem is in the first position, and to open the vehicle ignition circuit when the stem is in the second position, said housing including, means forming a lock cage, means securing the cylinder lock within said cage, the cage including a floor, the valve and the switch being positioned within the housing remotely from the cage, the means interconnecting the mortise sleeve and the element securing said mortise sleeve to the lock element such that unauthorized removal of the cylinder lock element disengages the mortise sleeve from the valve stem and effects a withdrawal of the mortise sleeve through the accessway, the accessway being sufficiently large for rotation of the mortise sleeve, yet sufficiently small to prevent rotation of the valve stem from inside the driving compartment through the utilization of conventional burglary implements, whereby unauthorized operation of the vehicle is prevented.

2. A system constructed in accordance with claim 1 wherein the cage includes gate means for blocking the accessway upon withdrawal of the mortise sleeve.

3. An automotive security system for use in a vehicle to prevent unauthorized operation of the vehicle, said system comprising a cylinder lock having a rotatable element and adapted to be affixed with the face thereof within the driving compartment of the vehicle for actuation from within said compartment, a housing adapted for positioning remote from said compartment and behind the face of said cylinder lock, the cylinder lock extending into the housing, a vehicle fuel line valve, said valve being positioned within the housing, an auxiliary ignition switch, said switch being positioned within the housing, the valve having a valve stem extending toward the lock, the valve stem including means forming a tenon end, means interconnecting the rotatable element of the cylinder lock for unitary rotation of the interconnecting means, the cylinder lock element and the tenon end, the interconnecting means and its operably linked elements rotatable from a first position wherein the valve is open to a second position wherein the valve blocks fuel flow therethrough, means within the housing actuating the switch to complete the vehicle ignition circuit when the stem is in the first position, and to open the vehicle ignition circuit when the stem is in the second position, and shielding means, said shielding means interposed between said valve means and said rotatable element and having an accessway therein, said interconnecting means secured to said lock such that unauthorized removal of said lock disengages said interconnecting means from the valve stem and effects a withdrawal of the interconnecting means through said accessway, the accessway being sufficiently large for rotation of said interconnecting means, yet sufficiently small to prevent rotation of the valve stem from inside the driving compartment upon removal of the lock through the utilization of conventional burglary implements, whereby unauthorized operation of the vehicle is prevented.

4. A system constructed in accordance with claim 3 wherein the means actuating the switch includes cam means engaging the valve stem and rotatable therewith.

5. A system constructed in accordance with claim 4 wherein the switch includes a plunger, the cam including a post for selective engagement with the plunger.

6. A system constructed in accordance with claim 3 wherein a guard plate is provided, means forming an aperture in the guard plate, the cylinder lock extending through the guard plate aperture and the housing being joined to the guard plate.

7. A security system constructed in accordance with claim 6 further including a cover plate, means hingedly securing the cover plate to the guard plate for selective movement from a position covering the face of the cylinder lock to a position wherein the face of the cylinder lock is accessible.

8. A system constructed in accordance with claim 3 further including an indicator lamp, circuit means interconnecting the indicator lamp with the switch for operation when the switch is engaged to complete the ignition circuit.

9. A security system constructed in accordance with claim 3 further including a vehicle havin an engine, a fuel storage tank and a fuel line, the fuel line interconnecting the storage tank with the engine, the vehicle further including an ignition circuit, means interconnecting the valve with the fuel line, and means interconnecting the switch with the ignition circuit.

10. A system constructed in accordance with claim 9 wherein the cylinder lock is on the floor of the vehicle, the vehicle including a floor covering, means forming a flap in the floor covering for concealing the cylinder lock.

* * * * *